US012785600B2

(12) United States Patent
Xu et al.

(10) Patent No.: US 12,785,600 B2
(45) Date of Patent: Nov. 3, 2026

(54) MOTOR CONTROLLER AND POWERTRAIN

(71) Applicant: Huawei Digital Power Technologies Co., Ltd., Shenzhen (CN)

(72) Inventors: Yankun Xu, Xi'an (CN); Lifei Bai, Xi'an (CN); Yihe Wang, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 202 days.

(21) Appl. No.: 18/652,385

(22) Filed: May 1, 2024

(65) Prior Publication Data

US 2024/0380349 A1 Nov. 14, 2024

(30) Foreign Application Priority Data

May 10, 2023 (CN) ......................... 202310525277.5

(51) Int. Cl.
*H02P 27/06* (2006.01)
*H02J 3/007* (2026.01)

(52) U.S. Cl.
CPC ............ *H02P 27/06* (2013.01); *H02J 3/0075* (2020.01)

(58) Field of Classification Search
CPC ...... H02J 1/102; H02J 7/0068; H02J 2310/48; H02J 7/0063; H02J 9/061; H02J 3/322; H02J 9/062; H02J 1/082; H02J 1/084; H02J 1/10; H02J 3/32; H02J 7/00308; H02J 7/1423; H02J 7/0047; H02J 7/342; H02J 1/00; H02J 9/066; H02J 7/0031; H02J 4/00; H02J 3/0075; H02J 7/855; H02M 7/5387; H02M 1/32; H02M 7/42; H02M 1/08; H02M 7/219; H02M 7/5395; H02M 1/4233; H02M 7/53871; H02M 7/4837; H02M 3/33507; H02M 1/36; H02P 27/06; H02P 29/024; H02P 4/00; H02P 2101/45;
(Continued)

(56) References Cited

U.S. PATENT DOCUMENTS 11,894,791 B2 * 2/2024 Hirakata ............... B60L 3/0061
2020/0180440 A1 6/2020 Uchimura et al.
(Continued)

FOREIGN PATENT DOCUMENTS

CN 113381633 A 9/2021
CN 115009201 A 9/2022
(Continued)

OTHER PUBLICATIONS

Gorji Saman A. et al: "Topologies and Control Schemes of Bidirectional DC-DC Power Converters: An Overview", IEEE Access, vol. 7, Jan. 1, 1900, total 23 pages.

*Primary Examiner* — Antony M Paul
(74) *Attorney, Agent, or Firm* — Slater Matsil, LLP

(57) ABSTRACT

In accordance with an embodiment, a motor controller includes a power supply control circuit, a safety state control circuit, and switching bridge arms. The power supply control circuit is configured to control a backup power supply to supply power to the safety state control circuit. The backup power supply includes a flyback conversion circuit. The power supply control circuit is configured to: in response to an output voltage of a main power supply being greater than or equal to a second preset voltage and a bus voltage being greater than a first preset voltage, control the flyback conversion circuit to stop operating.

19 Claims, 8 Drawing Sheets

(58) Field of Classification Search
CPC .... H02P 9/107; H02P 29/0241; H02P 29/027; H02P 3/22; H02P 9/305; H02P 29/02; H02P 6/085; H02H 7/122; H02H 3/202; H02H 3/087; H02H 9/04; H02H 7/0833; H02H 9/008; H02H 7/1225; H02H 7/1222; B60R 16/033; B60K 6/28; B60K 6/485; B60K 2006/4816; B60K 1/04; B60L 2210/10; B60L 15/007; B60L 50/64; B60L 3/00; B60L 2210/40; B60L 3/003; B60L 50/66
See application file for complete search history.

(56) References Cited

U.S. PATENT DOCUMENTS

| | | | |
|---|---|---|---|
| 2022/0320885 | A1 | 10/2022 | Lee et al. |
| 2023/0132537 | A1 | 5/2023 | Yi |

FOREIGN PATENT DOCUMENTS

| | | | |
|---|---|---|---|
| EP | 3101791 | A2 | 12/2016 |
| EP | 4087118 | A1 | 11/2022 |
| WO | 2022188098 | A1 | 9/2022 |

* cited by examiner

MOTOR CONTROLLER AND POWERTRAIN

CROSS-REFERENCE TO RELATED APPLICATION

This application claims priority to Chinese Patent Application No. 202310525277.5, filed on May 10, 2023, which is hereby incorporated by reference in its entirety.

TECHNICAL FIELD

This application relates to the field of motor control technologies, and in particular, to a motor controller and a powertrain.

BACKGROUND

With development of a motor control technology, a safety state control circuit has been used more widely. A power supply architecture of the safety state control circuit generally includes a main power supply and a backup power supply. The safety state control circuit receives electric energy output by the main power supply and the backup power supply, and controls a motor to enter a safety state. However, the backup power supply generally includes a flyback conversion circuit, and a power switching transistor in the flyback conversion circuit has poor reliability when an input voltage is high.

SUMMARY

In view of the foregoing problem, this application provides a motor controller and a powertrain, to control an operating status of a flyback conversion circuit based on an operating status of a main power supply and a voltage value of a bus voltage. This improves reliability of the flyback conversion circuit in a high-voltage condition.

According to a first aspect, this application provides a motor controller, where the motor controller includes a power supply control circuit, a safety state control circuit, and switching bridge arms. The safety state control circuit is configured to: receive electric energy of a main power supply or a backup power supply and control the switching bridge arm. The power supply control circuit is configured to control the backup power supply to supply power to the safety state control circuit. The backup power supply includes a flyback conversion circuit. The flyback conversion circuit is configured to: receive bus voltages at two ends of the switching bridge arm, convert the bus voltages, and supply power to the safety state control circuit. The power supply control circuit is configured to: in response to that the main power supply operates normally and the bus voltage is greater than a first preset voltage, control the flyback conversion circuit to stop operating. The motor controller provided in this application may control an operating status of the flyback conversion circuit in the backup power supply based on the bus voltage when the main power supply operates normally. This improves reliability of the flyback conversion circuit when the bus voltage is high, and prolongs a service life of a power switching transistor in the flyback conversion circuit.

With reference to the first aspect, in a possible implementation, in response to that the main power supply operates normally, the power supply control circuit is configured to: in response to a result of comparing the bus voltage with at least one of a plurality of voltage thresholds, control an operating status of the flyback conversion circuit. The motor controller provided in this application may control the operating status of the flyback conversion circuit in the backup power supply based on the result of comparing the bus voltage with the plurality of voltage thresholds when the main power supply operates normally. This improves the reliability of the flyback conversion circuit when the bus voltage is high, and prolongs the service life of the power switching transistor in the flyback conversion circuit.

With reference to the first aspect, in a possible implementation, the plurality of voltage thresholds include a first voltage, a second voltage, and a third voltage, and in response to that the main power supply operates normally, the power supply control circuit is configured to: in response to that the bus voltage is less than or equal to the first voltage, control the flyback conversion circuit to stop operating; and in response to that the bus voltage is greater than or equal to the second voltage and less than or equal to the third voltage, control the flyback conversion circuit to operate normally. The first voltage is less than or equal to the second voltage, the second voltage is less than or equal to the third voltage, and the third voltage is less than or equal to the first preset voltage. When the main power supply operates normally, the motor controller provided in this application may, in response to that the bus voltage is less than or equal to the first voltage, control the flyback conversion circuit to stop operating, and in response to that the bus voltage is greater than or equal to the second voltage and less than or equal to the third voltage, control the flyback conversion circuit to operate normally. In this way, the motor controller provided in this application may dynamically adjust the operating status of the flyback conversion circuit. This reduces power consumption of the flyback conversion circuit and a damage risk in a high-voltage environment.

With reference to the first aspect, in a possible implementation, in response to that the main power supply operates normally, the power supply control circuit is configured to: in response to that the bus voltage is greater than the first voltage and less than the second voltage and in response to that the bus voltage increases, control the flyback conversion circuit to stop operating; and in response to that the bus voltage is greater than the first voltage and less than the second voltage and in response to that the bus voltage decreases, control the flyback conversion circuit to operate normally.

With reference to the first aspect, in a possible implementation, in response to that the main power supply operates normally, the power supply control circuit is configured to: in response to that the bus voltage is greater than the third voltage and less than the first preset voltage and in response to that the bus voltage increases, control the flyback conversion circuit to operate normally; and in response to that the bus voltage is greater than the third voltage and less than the first preset voltage and in response to that the bus voltage decreases, control the flyback conversion circuit to stop operating.

With reference to the first aspect, in a possible implementation, the plurality of voltage thresholds include the second voltage, and in response to that the main power supply operates normally, the power supply control circuit is configured to: in response to that the bus voltage is greater than the second voltage, control the flyback conversion circuit to operate normally, and control the flyback conversion circuit to stop operating after preset time. The motor controller provided in this application may control the flyback conversion circuit to start a self-check procedure when the main power supply operates normally, and control the flyback conversion circuit to stop operating when the self-check procedure is completed after the preset time. This can reduce a risk that the flyback conversion circuit cannot start normally when the main power supply enters an abnormal operating state.

With reference to the first aspect, in a possible implementation, in response to that the main power supply operates normally, the power supply control circuit is configured to: control the flyback conversion circuit to stop operating. The motor controller provided in this application may control the flyback conversion circuit to continuously stop operating when the main power supply operates normally. This can reduce the power consumption of the flyback conversion circuit, and improve the reliability of the flyback conversion circuit in the high-voltage environment.

With reference to the first aspect, in a possible implementation, the power supply control circuit is configured to: in response to that the main power supply operates abnormally, control the flyback conversion circuit to operate normally. That the main power supply operates abnormally means that an output voltage of the main power supply is less than a second preset voltage. With reference to the first aspect, in a possible implementation, the flyback conversion circuit includes a power switching transistor, that the main power supply operates normally means that the output voltage of the main power supply is greater than or equal to the second preset voltage, that the flyback conversion circuit stops operating means that a switching frequency of the power switching transistor is zero and the power switching transistor is in an off state, and that the flyback conversion circuit operates normally means that the switching frequency of the power switching transistor is not zero.

With reference to the first aspect, in a possible implementation, the motor controller includes a control apparatus, each switching bridge arm includes an upper bridge arm switching transistor and a lower bridge arm switching transistor, the safety state control circuit is configured to output a safety state control signal to control the control apparatus, and the control apparatus is configured to: control, based on the safety state control signal, each upper bridge arm switching transistor and each lower bridge arm switching transistor of the switching bridge arm to be turned off; control, based on the safety state control signal, each upper bridge arm switching transistor of the switching bridge arm to be turned off and each lower bridge arm switching transistor to be turned on; or control, based on the safety state control signal, each upper bridge arm switching transistor of the switching bridge arm to be turned on and each lower bridge arm switching transistor to be turned off.

According to a second aspect, this application provides a powertrain, including a motor and the motor controller provided in any one of the implementations of the first aspect, where the motor controller is configured to control running of the motor.

In addition, for beneficial effects corresponding to implementations of the second aspect, refer to beneficial effects obtained in the implementations corresponding to the first aspect. Details are not described herein again.

DESCRIPTION OF REFERENCE SIGNS OF MAIN COMPONENTS

Figure 1:
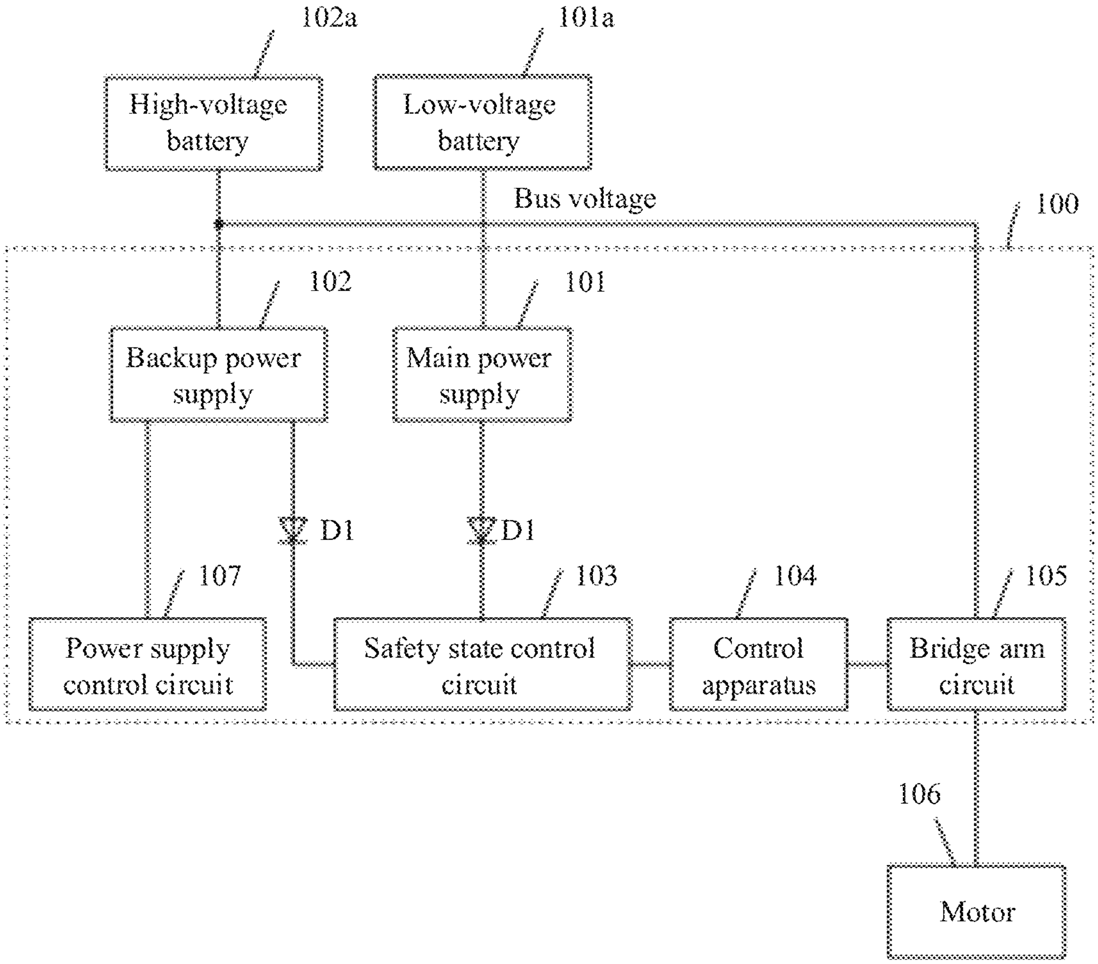
FIG. 1 is a schematic diagram of a structure of a motor controller according to this application.

Motor controller 100
Main power supply 101
Backup power supply 102
High-voltage battery **102*a***
Low-voltage battery **101*a***
Safety state control circuit 103
Control apparatus 104
Bridge arm circuit 105
Motor 106
Diodes D1 and D2
Bus voltage U
Capacitor C1
Primary-side winding 1021
Secondary-side winding 1022
Zener diode DZ
Leakage inductance L
Power switching transistor M
Resistor R

DESCRIPTION OF EMBODIMENTS

The following clearly describes technical solutions in embodiments of this application with reference to accompanying drawings in embodiments of this application.

It may be understood that a connection relationship described in this application is a direct or indirect connection. For example, that A is connected to B may be that A is directly connected to B, or may be that A is indirectly connected to B by using one or more other electrical components. For example, A may be directly connected to C, and C may be directly connected to B, so that A and B are connected by using C. It may be further understood that "A is connected to B" described in this application may be that A is directly connected to B, or may be that A is indirectly connected to B by using one or more other electrical components.

In descriptions of this application, unless otherwise specified, "/" means "or". For example, A/B may represent A or B. The term "and/or" in this specification describes only an association relationship between associated objects and indicates that three relationships may exist. For example, A and/or B may represent the following three cases: Only A exists, both A and B exist, and only B exists.

In descriptions of this application, the words such as “first”, “second”, and the like are merely used to distinguish between different objects, and do not limit quantities and execution sequences. In addition, the words such as “first”, “second”, and the like are not necessarily different. In addition, the terms “including” and “having” and any other variants thereof are intended to cover a non-exclusive inclusion.

The technical solutions of this application are further described below in detail with reference to the accompanying drawings.

FIG. 1 is a schematic diagram of a structure of a motor controller 100 according to this application. The motor controller 100 is configured to control running of a motor 106. The motor controller 100 includes a main power supply 101, a backup power supply 102, a safety state control circuit 103, a control apparatus 104, and a bridge arm circuit 105.

The main power supply 101 and the backup power supply 102 jointly supply power to the safety state control circuit 103. Specifically, an output terminal of the main power supply 101 is connected to an input terminal of the safety state control circuit 103 by using a diode D1, and an output terminal of the backup power supply 102 is connected to an input terminal of the safety state control circuit 103 by using another diode D1. In this way, when amplitudes of the output voltages of the main power supply 101 and the backup power supply 102 are different, a power supply voltage of the safety state control circuit 103 is a larger output voltage of the main power supply 101 and the backup power supply 102. For example, if an output voltage of the main power supply 101 is a direct current 12 V, and an output voltage of the backup power supply 102 is a direct current 10 V, the power supply voltage of the safety state control circuit 103 is 12 V.

In an embodiment, a low-voltage battery 101*a* supplies power to the main power supply 101, and a high-voltage battery 102*a* supplies power to the backup power supply 102. An output terminal of the high-voltage battery 102*a* is connected to an end of each upper bridge arm switching transistor. In this way, an output voltage of the high-voltage battery 102*a* is a bus voltage, and an input voltage of the backup power supply 102 is also a bus voltage, so that the backup power supply 102 may convert the input bus voltage, and supply power to the safety state control circuit 103.

The safety state control circuit 103 is configured to control the motor 106 to enter a safety state. Specifically, based on a functional safety requirement of the motor 106, to prevent the motor 106 from generating unexpected torque, the safety state control circuit 103 may control the motor 106 to enter the safety state in an emergency. The emergency includes a fault in the motor controller 100, a fault in the motor 106, and the like. The safety state control circuit 103 may output a safety state control signal to the control apparatus 104, and the control apparatus 104 may control, based on the safety state control signal, the bridge arm circuit 105 to control the motor 106 to enter the safety state. The bridge arm circuit 105 includes switching bridge arms. Each switching bridge arm includes an upper bridge arm switching transistor and a lower bridge arm switching transistor. A connection point between the upper bridge arm switching transistor and the lower bridge arm switching transistor in each switching bridge arm is a bridge arm midpoint of the switching bridge arm, and each switching bridge arm outputs a corresponding single-phase alternating current to the motor 106 by using the bridge arm midpoint.

The control apparatus 104 may control the upper bridge arm switching transistor and the lower bridge arm switching transistor in the bridge arm circuit 105 to be turned on or off, to control the motor 106 to enter the safety state. For example, the safety state control signal includes a stop pulse-width modulation output (SPO) signal and an active short circuit (ASC) signal. The control apparatus 104 may control, based on the SPO signal, each upper bridge arm switching transistor and each lower bridge arm switching transistor in the bridge arm circuit 105 to be turned off, so that the motor 106 enters an SPO safety state; may control, based on the ASC signal, each upper bridge arm switching transistor in the bridge arm circuit 105 to be turned off and each lower bridge arm switching transistor to be turned on, so that the motor 106 enters an ASC safety state; or may control, based on an ASC signal, each upper bridge arm switching transistor in the bridge arm circuit 105 to be turned on and each lower bridge arm switching transistor to be turned off, so that the motor 106 enters an ASC safety state.

It may be understood that the control apparatus 104 outputs a control signal to control the upper bridge arm switching transistor and the lower bridge arm switching transistor. A pulse-width modulation (PWM) signal is used as an example. The control apparatus 104 may adjust an output frequency of the PWM signal to adjust switching frequencies of the upper bridge arm switching transistor and the lower bridge arm switching transistor, and the control apparatus 104 may further adjust a duty cycle of the PWM signal to adjust a three-phase current output by the bridge arm circuit 105.

In this embodiment of this application, the control apparatus 104 may include a pulse-width modulation (PWM) controller, a central processing unit (CPU), another general purpose processor, a digital signal processor (DSP), an application-specific integrated circuit (ASIC), a field-programmable gate array (FPGA), or another programmable logic device, a discrete gate, a transistor logic device, or the like.

In an embodiment, an anode of the diode D1 may alternatively be connected to one end of a filter capacitor, the other end of the filter capacitor is grounded, and the filter capacitor is configured to filter the output voltage of the main power supply 101 and/or the output voltage of the backup power supply 102.

Figure 2:
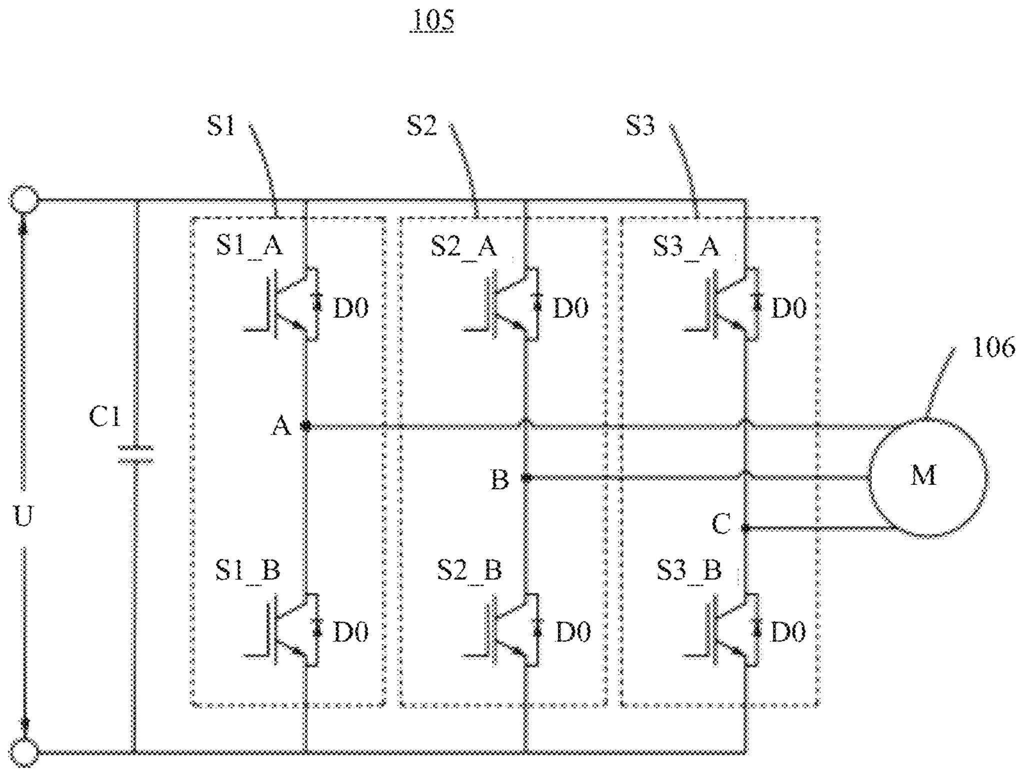
FIG. 2 is a schematic diagram of a structure of a bridge arm circuit according to this application.

FIG. 2 is a schematic diagram of a structure of the bridge arm circuit 105 according to this application. As shown in FIG. 2, the switching bridge arm receives a bus voltage U by using a positive electrode and a negative electrode of a bus. The switching bridge arm is connected in parallel between the positive electrode and the negative electrode of the bus. The upper bridge arm switching transistor and the lower bridge arm switching transistor in each switching bridge arm are connected in series between the positive electrode and the negative electrode of the bus.

For example, the bridge arm circuit 105 includes a first switching bridge arm S1, a second switching bridge arm S2, and a third switching bridge arm S3. Two ends of the first switching bridge arm S1, the second switching bridge arm S2, and the third switching bridge arm S3 are respectively connected to the positive electrode and the negative electrode of the bus. Bridge arm midpoints of the first switching bridge arm S1, the second switching bridge arm S2, and the third switching bridge arm S3 are respectively connected to three-phase windings of the motor 106. Each of the bridge arm midpoints of the first switching bridge arm S1, the second switching bridge arm S2, and the third switching bridge arm S3 outputs a single-phase alternating current.

The first switching bridge arm S1 includes a first upper bridge arm switching transistor S1_A and a first lower bridge arm switching transistor S1_B. A drain of the first upper bridge arm switching transistor S1_A is electrically connected to one end of a capacitor C1 and one electrode of the bus, a source of the first lower bridge arm switching transistor S1_B is electrically connected to the other end of the capacitor C1 and the other electrode of the bus, and a source of the first upper bridge arm switching transistor S1_A is electrically connected to a drain of the first lower bridge arm switching transistor S1_B and is used as a first bridge arm midpoint A of the first switching bridge arm S1. The first switching bridge arm S1 is configured to output a first-phase alternating current by using the first bridge arm midpoint A.

The second switching bridge arm S2 includes a second upper bridge arm switching transistor S2_A and a second lower bridge arm switching transistor S2_B. A drain of the second upper bridge arm switching transistor S2_A is electrically connected to one end of the capacitor C1 and one electrode of the bus, a source of the second lower bridge arm switching transistor S2_B is electrically connected to the other end of the capacitor C1 and the other electrode of the bus, and a source of the second upper bridge arm switching transistor S2_A is electrically connected to a drain of the second lower bridge arm switching transistor S2_B and is used as the second bridge arm midpoint B of the second switching bridge arm S2. The second bridge arm midpoint B is configured to output a second-phase alternating current.

The third switching bridge arm S3 includes a third upper bridge arm switching transistor S3_A and a third lower bridge arm switching transistor S3_B. A drain of the third upper bridge arm switching transistor S3_A is electrically connected to one end of the capacitor C1 and one electrode of the bus, a source of the third lower bridge arm switching transistor S3_B is electrically connected to the other end of the capacitor C1 and the other electrode of the bus, and a source of the third upper bridge arm S3_A is electrically connected to a drain of the first lower bridge arm switching transistor S3_B and is used as the third bridge arm midpoint C of the third switching bridge arm S3. The third bridge arm midpoint C is configured to output a third-phase alternating current.

It may be understood that when the motor 106 does not enter the safety state, the upper bridge arm switching transistor and the lower bridge arm switching transistor in each switching bridge arm in the bridge arm circuit 105 are mutually turned on. For example, when the upper bridge arm switching transistor is turned on, the lower bridge arm switching transistor is turned off; and when the lower bridge arm switching transistor is turned on, the upper bridge arm switching transistor is turned off.

In an embodiment, the motor controller 100 further includes the capacitor C1. The capacitor C1 is electrically connected between the positive electrode and the negative electrode of the bus. The capacitor C1 is configured to stabilize the bus voltage.

In an embodiment, the upper bridge arm switching transistors and the lower bridge arm switching transistors of the first switching bridge arm S1, the second switching bridge arm S2, and the third switching bridge arm S3 are metal oxide semiconductor (MOS) transistors. Each upper bridge arm switching transistor or lower bridge arm switching transistor includes a freewheeling diode DO. The freewheeling diode DO is used as a freewheeling channel of a load current, and can prevent the switching transistor from being damaged.

Figure 3:
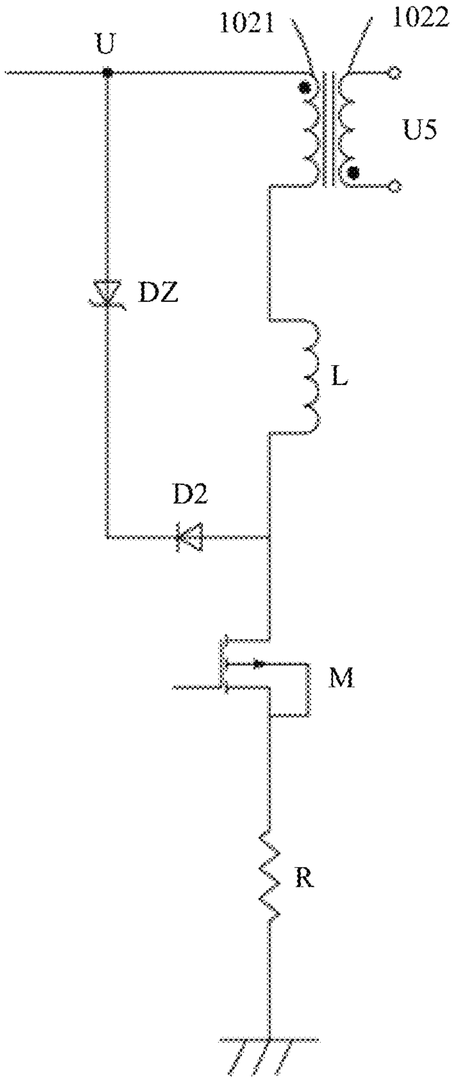
FIG. 3 is a circuit diagram of a backup power supply according to this application.

FIG. 3 is a circuit diagram of the backup power supply 102 according to this application. The backup power supply 102 includes a flyback conversion circuit. The flyback conversion circuit includes a power switching transistor M, a resistor R, a diode D2, a Zener diode DZ, a primary-side winding 1021, and a secondary-side winding 1022.

A dotted terminal of the primary-side winding 1021 is connected to an anode of the Zener diode DZ, and the dotted terminal of the primary-side winding 1021 receives the bus voltage U. A cathode of the Zener diode DZ is connected to a cathode of the diode D2, and an anode of the diode D2 is connected to a drain of the power switching transistor M. A gate of the power switching transistor M receives a control signal of the control apparatus 104, a source of the power switching transistor M is connected to one end of the resistor R, and the other end of the resistor R is grounded. An output voltage Vo at two ends of the secondary-side winding 1022 supplies power to the safety state control circuit 103.

The diode D2 and the Zener diode DZ that are connected in series are configured to provide overvoltage protection for the power switching transistor M. For example, the diode D2 and the Zener diode DZ can prevent a peak voltage from breaking down the power switching transistor M.

When the power switching transistor M is turned on, the primary-side winding 1021 receives the bus voltage U and stores energy. When the power switching transistor M is turned off, the primary-side winding 1021 is coupled to the secondary-side winding 1022 to transmit the stored energy to the secondary-side winding 1022, so that the output voltage Vo of the secondary-side winding 1022 supplies power to the safety state control circuit 103.

It may be understood that the control apparatus 104 may output the control signal to control the power switching transistor M. In an embodiment, the control signal may be a PWM signal. The control apparatus 104 may adjust an output frequency of the PWM signal to adjust a switching frequency of the power switching transistor M, and the control apparatus 104 may further adjust a duty cycle of the PWM signal to adjust the output voltage Vo of the secondary-side winding 1022.

It may be understood that because the primary-side winding 1021 is not completely coupled to the secondary-side winding 1022, an equivalent leakage inductance L is generated, and the leakage inductance L is equivalently electrically connected between an undotted terminal of the primary-side winding 1021 and the anode of the diode D2.

It may be understood that in this embodiment, a single-transistor flyback conversion circuit is used as an example of the flyback conversion circuit. Because the flyback conversion circuit includes the power switching transistor M, and the power switching transistor M has limited operating stability and a limited life in a high-voltage environment, when a received bus voltage U is high, reliability of the power switching transistor M is poor.

Therefore, the motor controller 100 provided in this application may control an operating status of the flyback conversion circuit based on an operating status of the main power supply and a value of the bus voltage. This improves reliability of the flyback conversion circuit in a high-voltage condition.

Specifically, refer to FIG. 1 to FIG. 3. The motor controller 100 further includes a power supply control circuit 107. The power supply control circuit 107 is configured to: in response to that the main power supply 101 operates normally, control an operating status of the flyback conversion circuit based on the bus voltage U.

For example, the power supply control circuit 107 may, in response to that the bus voltage U is greater than a first preset voltage, control the flyback conversion circuit in the backup power supply 102 to stop operating. It may be understood that in a condition in which the main power supply 101 operates normally and the bus voltage U is greater than the first preset voltage, the power supply control circuit 107 may control the flyback conversion circuit to stop operating. This reduces operating duration of the flyback conversion circuit in an environment in which the bus voltage U is excessively high, improves reliability of the flyback conversion circuit in the high-voltage condition, and reduces power consumption of the backup power supply 102.

For another example, the power supply control circuit 107 may, in response to a result of comparing the bus voltage U to at least one of a plurality of voltage thresholds, control the operating status of the flyback conversion circuit. For example, the plurality of voltage thresholds include a first voltage U1, a second voltage U2, and a third voltage U3. The power supply control circuit 107 may, in response to that the bus voltage U is less than or equal to the first voltage U1, control the flyback conversion circuit to stop operating. For another example, the power supply control circuit 107 may, in response to that the bus voltage U is greater than or equal to the second voltage U2 and less than or equal to the third voltage U3, control the flyback conversion circuit to operate normally. The first voltage U1 is less than or equal to the second voltage U2, the second voltage is less than or equal to the third voltage U3, and the third voltage U3 is less than or equal to a first preset voltage U4.

For still another example, the power supply control circuit 107 may, in response to that the bus voltage U is greater than the first voltage U1 and less than the second voltage U2 and in response to that the bus voltage U increases, control the flyback conversion circuit to stop operating. Alternatively, the power supply control circuit 107 may, in response to that the bus voltage U is greater than the first voltage U1 and less than the second voltage U2 and in response to that the bus voltage U decreases, control the flyback conversion circuit to operate normally.

For yet another example, the power supply control circuit 107 may, in response to that the bus voltage U is greater than the third voltage U3 and less than the first preset voltage U4 and in response to that the bus voltage U increases, control the flyback conversion circuit to operate normally. Alternatively, the power supply control circuit 107 may, in response to that the bus voltage U is greater than the third voltage U3 and less than the first preset voltage U4 and in response to that the bus voltage U decreases, control the flyback conversion circuit to stop operating.

For still yet another example, in response to that the main power supply 101 operates normally, the power supply control circuit 107 may, in response to that the bus voltage U is greater than the second voltage U2, control the flyback conversion circuit to operate normally, and control the flyback conversion circuit to stop operating after preset time T. Alternatively, the power supply control circuit 107 may directly control the flyback conversion circuit to stop operating.

In an embodiment, that the main power supply 101 operates normally means that an output voltage Vol of the main power supply 101 is greater than or equal to a second preset voltage. That the flyback conversion circuit operates normally may include that the output voltage of the secondary-side winding 1022 is not zero, the switching frequency of the power switching transistor M is not zero, and the like. That the flyback conversion circuit stops operating may include that the switching frequency of the power switching transistor M is zero, a side that is of the primary-side winding 1021 and that is configured to receive the bus voltage U is disconnected, the output voltage of the secondary-side winding 1022 is zero, and the like.

In addition, the power supply control circuit 107 is further configured to: in response to that the main power supply 101 operates abnormally, control the flyback conversion circuit to operate normally. That the main power supply 101 operates abnormally means that the output voltage Vol of the main power supply is less than the second preset voltage.

In this embodiment, the first preset voltage U4 may be 750 V, the first voltage U1 may be 60 V, the second voltage U2 may be 190 V, and the third voltage U3 may be 600 V.

Figure 9:
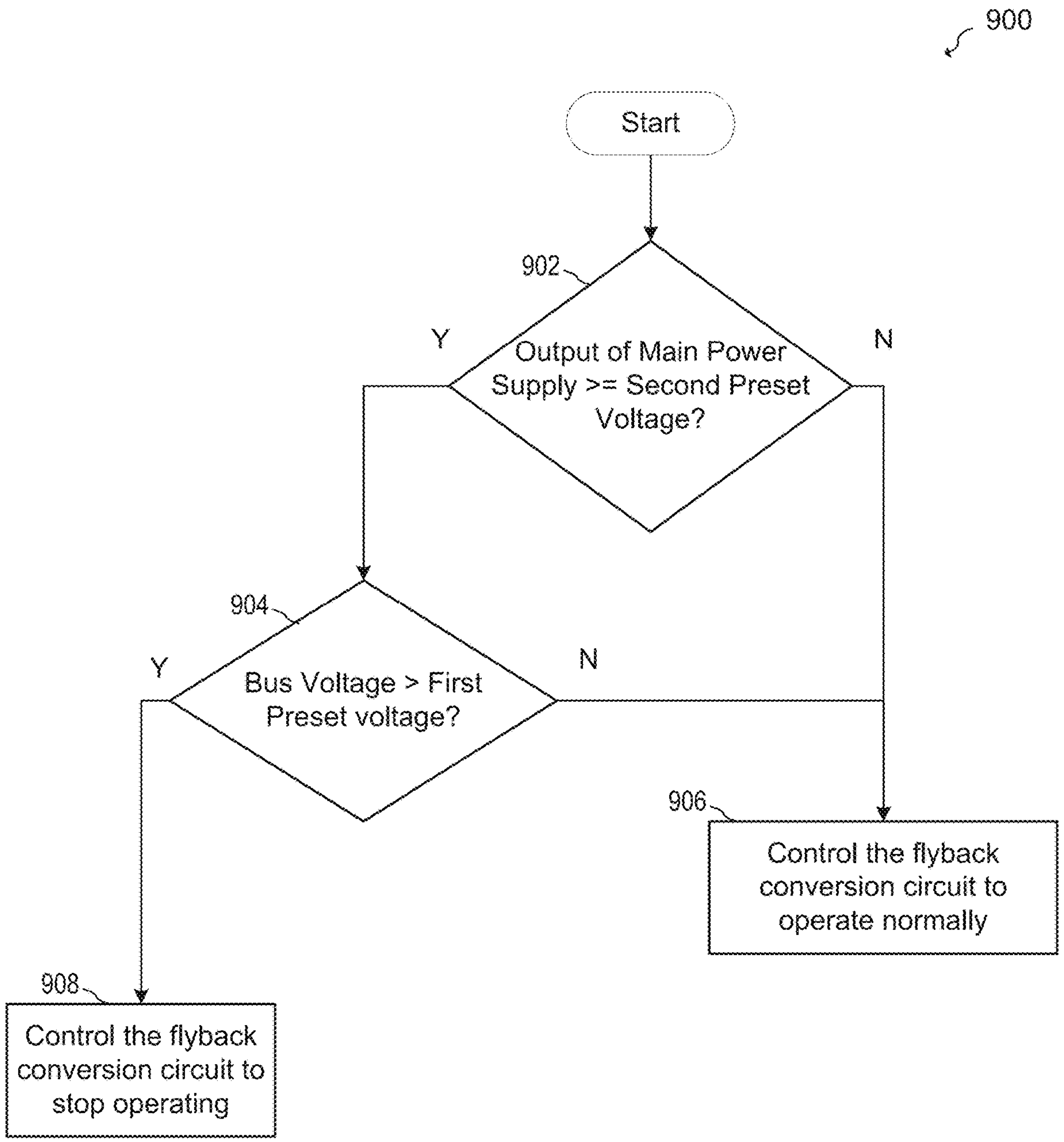
FIG. 9 illustrates a method according to an implementation.

FIG. 9 shows a method according to an implementation. In step 902, an output of the main power supply is compared to a second preset voltage. If the output of the main power supply is greater than or equal to the second preset voltage (indicating that the main power supply is operating normally), the method proceeds to step 904. If the output of the main power supply is less than the second preset voltage, indicating that the main power supply is operating abnormally, the flyback conversion circuit is controlled to operate normally in step 906. In step 904, the bus voltage is compared to the first preset voltage. If the bus voltage is greater than the first preset voltage, then the flyback conversion circuit is controlled to stop operating in step 908. Otherwise the flyback conversion circuit operates normally in step 906.

It may be understood that when the main power supply 101 operates normally, the power supply control circuit 107 controls the operating status of the flyback conversion circuit based on different bus voltages U, to optimize control logic of the flyback conversion circuit, and to maximumly control the flyback conversion circuit to stop operating in the high-voltage condition. This improves the reliability of the flyback conversion circuit in the high-voltage condition, and prolongs a service life of the flyback conversion circuit. In addition, when the main power supply 101 operates abnormally, the power supply control circuit 107 may further control the flyback conversion circuit to operate normally, so that the flyback conversion circuit can quickly start when the main power supply 101 operates abnormally. This ensures continuous power supply to the safety state control circuit 103, and improves safety performance of the motor 106.

In an embodiment, the power supply control circuit 107 may obtain the bus voltage by using an electronic component such as a voltage sensor, a voltage detection circuit, or the like, to obtain the result of comparing the bus voltage with the plurality of voltage thresholds, or directly obtain the result of comparing the bus voltage with the plurality of voltage thresholds, to perform corresponding control.

Figure 4:
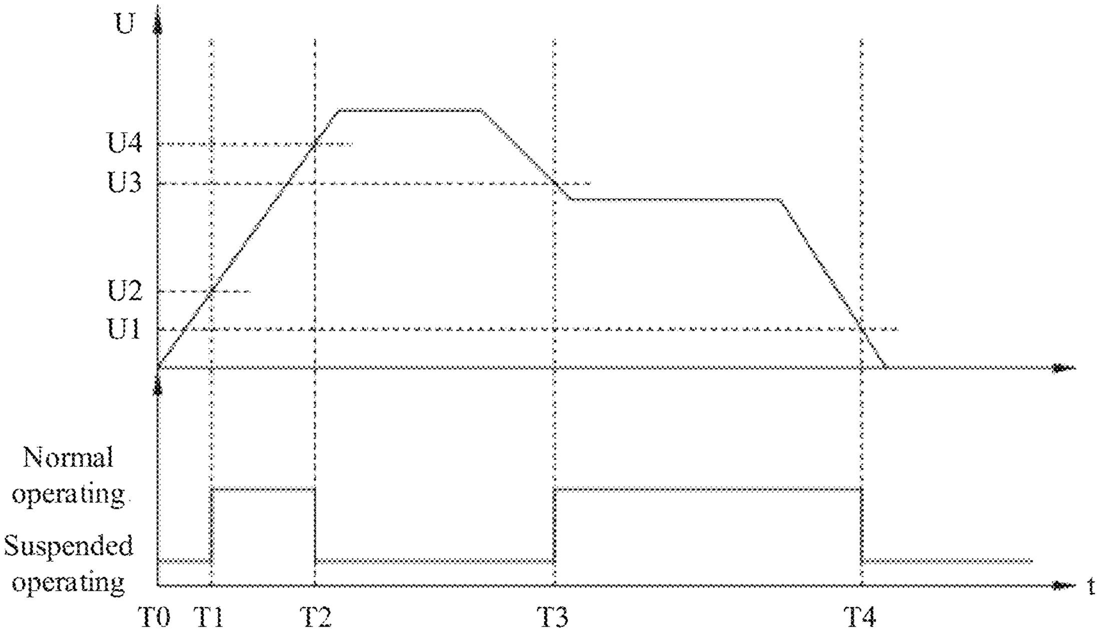
FIG. 4 is a time sequence diagram of an operating procedure of a motor controller according to this application.
Figure 5:
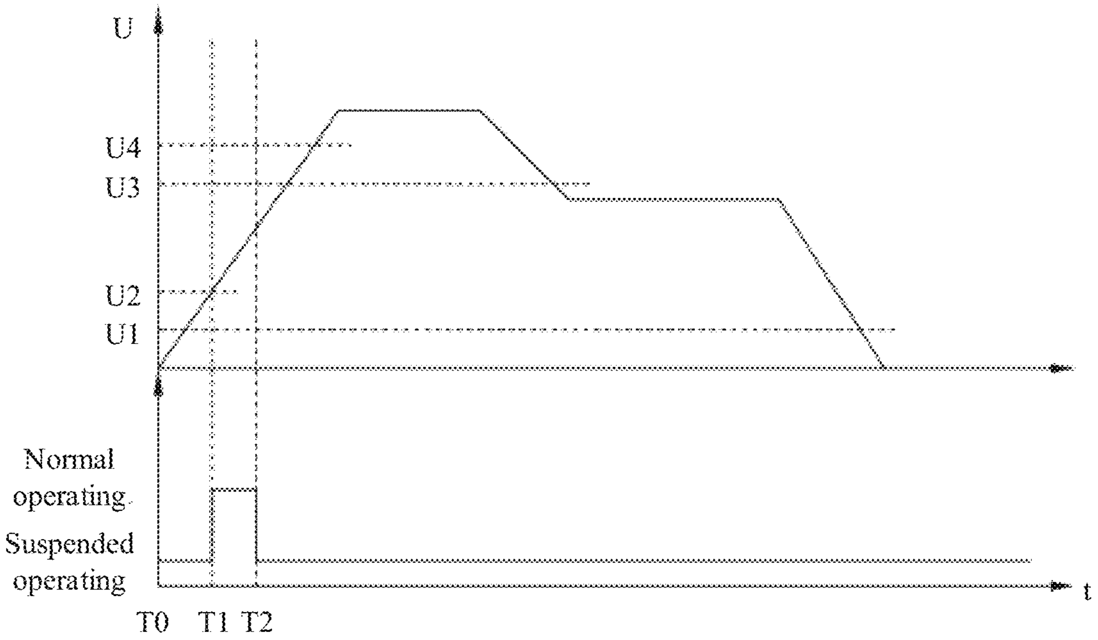
FIG. 5 is a time sequence diagram of another operating procedure of a motor controller according to this application.

The following describes operating procedures of the motor controller 100 with reference to FIG. 4 and FIG. 5.

As shown in FIG. 4, in this embodiment, an example in which the main power supply 101 operates normally is used. As the motor 106 runs, the bus voltage U is controlled by the motor controller 100 and a vehicle control unit (VCU) and dynamically changes.

At a moment TO, the motor controller 100 starts to be powered on, and the bus voltage U gradually increases from zero. In this case, the bus voltage U is less than or equal to the first voltage U1, the power supply control circuit 107 controls the flyback conversion circuit to stop operating, and an output voltage of the flyback conversion circuit is zero.

At a moment T1, the motor 106 continues to run, and the bus voltage U continues to increase. When the bus voltage U increases to be greater than or equal to the second voltage U2, a power-on procedure of the motor controller 100 ends, and the motor controller 100 enters a running state. In this case, the power supply control circuit 107 controls the flyback conversion circuit to operate normally, and the output voltage of the flyback conversion circuit is not zero.

At a moment T2, the motor 106 continues to run, and the bus voltage U continues to increase. When the bus voltage U increases to be greater than the first preset voltage U4, the bus voltage U is high, and the power supply control circuit 107 controls the flyback conversion circuit to stop operating. This ensures reliability of the flyback conversion circuit in a high-voltage environment.

At a moment T3, the motor 106 continues to run, and in this case, the bus voltage U decreases. When the bus voltage U decreases to be less than or equal to the third voltage U3, the bus voltage U is already out of the high-voltage condition, and the power supply control circuit 107 controls the flyback conversion circuit to operate normally.

At a moment T4, the motor 106 gradually stops operating, the motor controller 100 enters from the running state to a power-off procedure, and the bus voltage U continues to decrease. When the bus voltage U decreases to be less than or equal to the first voltage U1, the power supply control circuit 107 controls the flyback conversion circuit to suspend or stop operating.

It may be understood that in an embodiment, the motor controller 100 and the VCU control the bus voltage U based on a running status of the motor 106. As the running status of the motor 106 is switched, the bus voltage U also changes accordingly. The motor controller 100 provided in this application may control the operating status of the flyback conversion circuit based on a dynamic change of the bus voltage U in a case in which the main power supply 101 operates normally. This improves reliability of the power switching transistor M in the flyback conversion circuit in the high-voltage condition, and prolongs a service life of the power switching transistor M.

As shown in FIG. 5, in another embodiment, a running status and a running time sequence of the motor 106 are the same as the running status and the running time sequence in FIG. 4, but a control policy of the power supply control circuit 107 for the flyback conversion circuit is different.

Specifically, at a moment T1, the motor controller 100 is in a power-on procedure. When the bus voltage U increases to be greater than or equal to the second voltage U2, the power supply control circuit 107 controls the flyback conversion circuit to operate normally. In this case, the flyback conversion circuit starts a self-check procedure to check whether the flyback conversion circuit can operate normally, to reduce a risk that when the main power supply 101 operates abnormally, the flyback conversion circuit cannot operate normally and causes the safety state control circuit 103 to be powered off.

At a moment T2, the flyback conversion circuit completes the self-check procedure. After preset time, the power supply control circuit 107 controls the flyback conversion circuit to stop operating. This reduces operating duration of the flyback conversion circuit, and reduces power consumption of the flyback conversion circuit.

Figure 6:
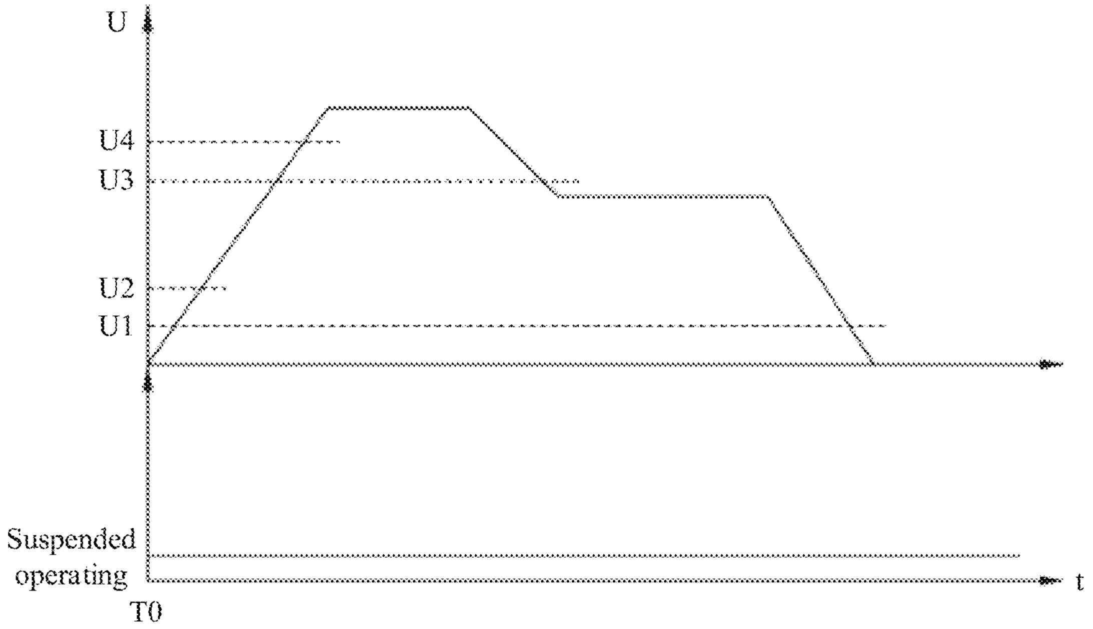
FIG. 6 is a time sequence diagram of still another operating procedure of a motor controller according to this application.

As shown in FIG. 6, in still another embodiment, a running status and a running time sequence of the motor 106 are the same as the running status and the running time sequence in FIG. 4, but a control policy of the power supply control circuit 107 for the flyback conversion circuit is different.

Specifically, when the main power supply 101 operates normally, the backup power supply 102 may be continuously turned off. Therefore, the power supply control circuit 107 controls the flyback conversion circuit to continuously stop operating or stop operating. This can further reduce the power consumption of the flyback conversion circuit, reduce the operating duration of the flyback conversion circuit in the high-voltage condition, and improve the reliability of the power switching transistor M.

Figure 7:
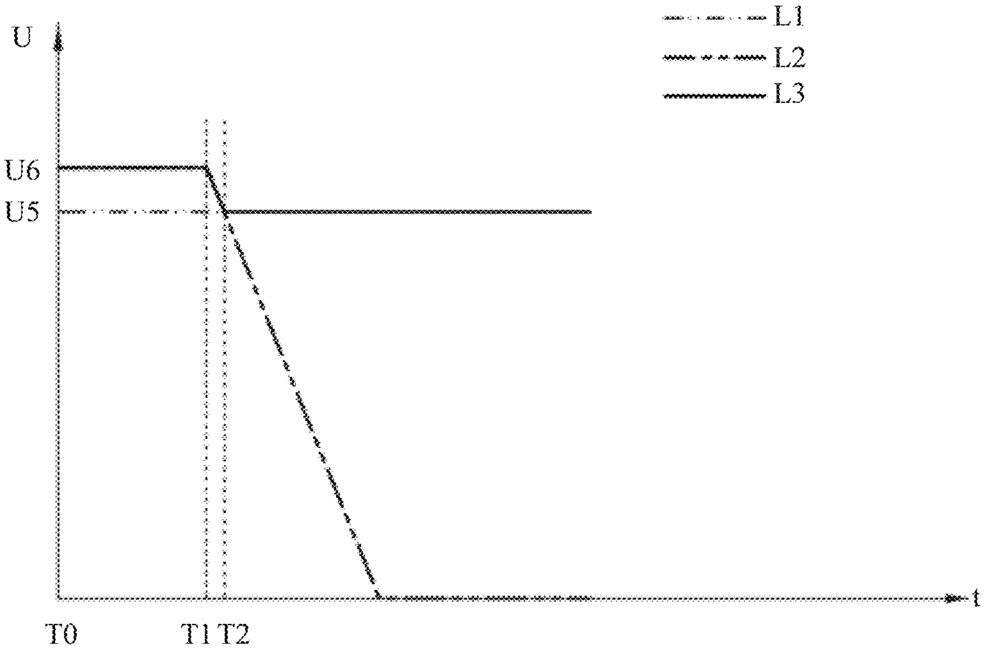
FIG. 7 is a time sequence diagram of an output voltage of a backup power supply, an output voltage of a main power supply, and an input voltage of a safety state control circuit according to this application.

FIG. 7 is a time sequence diagram of the output voltage of the backup power supply 102, the output voltage of the main power supply 101, and an input voltage of the safety state control circuit 103 in the motor controller 100 according to this application. As shown in FIG. 7, a broken line L1 represents the output voltage of the backup power supply 102, a broken line L2 represents the output voltage of the main power supply 101, and a broken line L3 represents the input voltage of the safety state control circuit 103.

In this embodiment, an example in which the flyback conversion circuit is in a normal operating state is used. Before a moment T1, the output voltage of the main power supply 101 is U6, the main power supply 101 operates normally, and the input voltage of the safety state control circuit 103 is determined by the output voltage U6 of the main power supply 101. Therefore, the broken line L2 and the broken line L3 overlap before the moment T1.

At the moment T1, the main power supply 101 encounters an abnormal power failure, and enters an abnormal operating state. In this case, the output voltage of the main power supply 101 decreases, and an output voltage U5 of the backup power supply 102 remains constant.

At a moment T2, when the output voltage of the main power supply 101 decreases to be less than the output voltage of the backup power supply 102, the input voltage of the safety state control circuit 103 is determined by the output voltage U5 of the backup power supply 102. Because the backup power supply 102 continuously operates normally, the backup power supply 102 can continue to supply power to the safety state control circuit 103 when the main power supply 101 operates abnormally.

Figure 8:
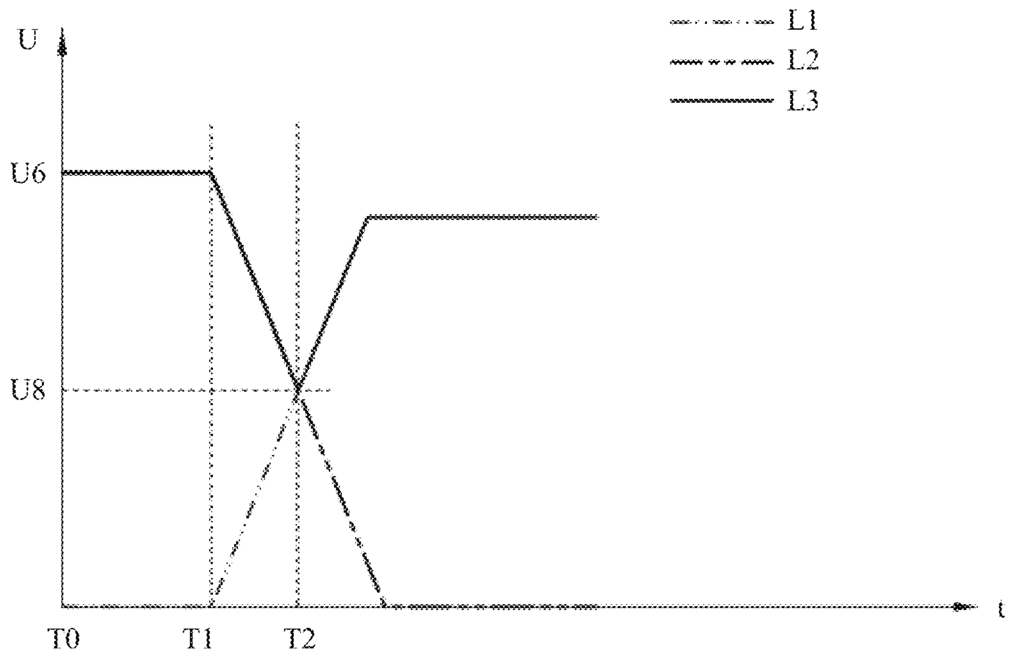
FIG. 8 is another time sequence diagram of an output voltage of a backup power supply, an output voltage of a main power supply, and an input voltage of a safety state control circuit according to this application.

FIG. 8 is another time sequence diagram of the output voltage of the backup power supply 102, the output voltage of the main power supply 101, and the input voltage of the safety state control circuit 103 in the motor controller 100 according to this application. As shown in FIG. 8, a broken line L1 represents the output voltage of the backup power supply 102, a broken line L2 represents the output voltage of the main power supply 101, and a broken line L3 represents the input voltage of the safety state control circuit 103.

In this embodiment, an example in which the flyback conversion circuit stops operating is used. Before a moment T1, an output voltage U6 of the main power supply 101 is not zero, the main power supply 101 operates normally, and the input voltage of the safety state control circuit 103 is determined by the output voltage U6 of the main power supply 101. Therefore, the broken line L2 and the broken line L3 overlap before the moment T1.

At the moment T1, the main power supply 101 encounters an abnormal power failure, and enters an abnormal operating state. In this case, the output voltage of the main power supply 101 decreases. In this case, the power supply control circuit 107, in response to that the main power supply 101 operates abnormally, controls the flyback conversion circuit to operate normally, and the output voltage of the backup power supply 102 gradually increases from zero.

At a moment T2, the output voltage of the backup power supply 102 increases to U8, and the output voltage of the main power supply 101 decreases to U8. In this case, the output voltage of the backup power supply 102 increases to a current value of the output voltage of the main power supply 101, and the input voltage of the safety state control circuit 103 is determined by the output voltage U8 of the backup power supply 102. The output voltage of the backup power supply 102 continues to increase, and finally remains constant. This can ensure that a power supply voltage of the safety state control circuit 103 is stable. Therefore, after the moment T2, the broken line L1 and the broken line L3 overlap.

Figure 10:
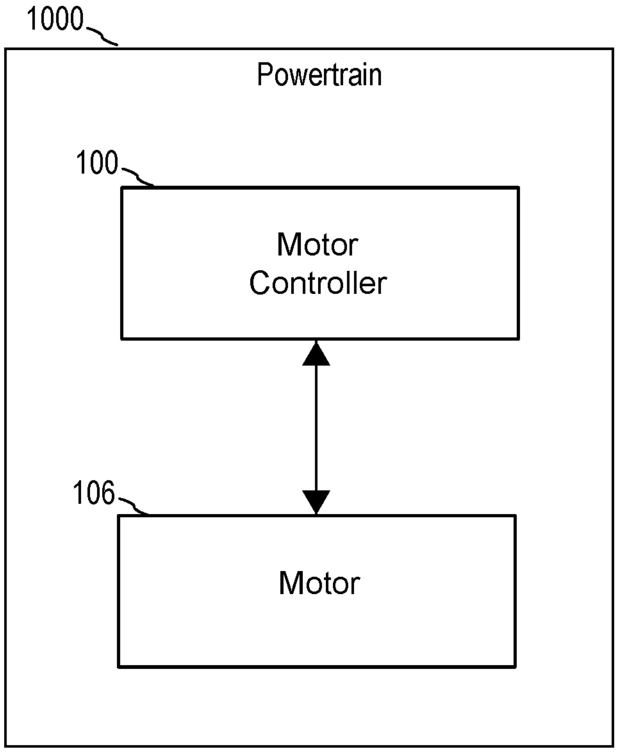
FIG. 10 illustrates a powertrain according to an implementation.

This application further provides a powertrain 1000 that includes the motor controller 100 and the motor 106 as shown in FIG. 10. The motor controller 100 is configured to: in response to that the main power supply 101 operates normally, control the operating status of the flyback conversion circuit based on the bus voltage U; or control, when the main power supply 101 operates abnormally, the flyback conversion circuit to operate normally.

It may be understood that the motor controller 100 in the powertrain provided in this application may control the operating status of the flyback conversion circuit based on the operating status of the main power supply 101 and the value of the bus voltage. This improves the reliability of the flyback conversion circuit in the high-voltage condition.

What is claimed is:

1. A motor controller, comprising:

a power supply control circuit;

a safety state control circuit configured to receive electric energy of a main power supply or a backup power supply and control a switching bridge arm; and the switching bridge arm, wherein:

the power supply control circuit is configured to control the backup power supply to supply power to the safety state control circuit, the backup power supply comprises a flyback conversion circuit configured to receive a bus voltage across two ends of the switching bridge arm, convert the bus voltage, and supply power to the safety state control circuit, and the power supply control circuit is configured to, in response to an output voltage of the main power supply being greater than or equal to a second preset voltage and the bus voltage being greater than a first preset voltage, control the flyback conversion circuit to stop operating.

2. The motor controller according to claim 1, wherein the power supply control circuit is configured to, in response to the output voltage of the main power supply being greater than or equal to the second preset voltage:

control an operating status of the flyback conversion circuit in response to a result of comparing the bus voltage with at least one of a plurality of voltage thresholds, wherein the plurality of voltage thresholds comprise a first voltage, a second voltage, and a third voltage, the first voltage is less than or equal to the second voltage, the second voltage is less than or equal to the third voltage, and the third voltage is less than or equal to the first preset voltage.

3. The motor controller according to claim 2, wherein the power supply control circuit is configured to, in response to the output voltage of the main power supply being greater than or equal to the second preset voltage:

control the flyback conversion circuit to stop operating in response to the bus voltage being less than or equal to the first voltage; and control the flyback conversion circuit to have a non-zero switching frequency for a power switching transistor of the flyback conversion circuit in response to the bus voltage being greater than or equal to the second voltage and less than or equal to the third voltage.

4. The motor controller according to claim 2, wherein the power supply control circuit is configured to, in response to the output voltage of the main power supply being greater than or equal to the second preset voltage:

control the flyback conversion circuit to stop operating in response to the bus voltage being greater than the first voltage and less than the second voltage and in response to the bus voltage increasing; and control the flyback conversion circuit to have a non-zero switching frequency for a power switching transistor of the flyback conversion circuit in response to the bus voltage being greater than the first voltage and less than the second voltage and in response to the bus voltage decreasing.

5. The motor controller according to claim 2, wherein the power supply control circuit is configured to, in response to the output voltage of the main power supply being greater than or equal to the second preset voltage:

control the flyback conversion circuit to have a non-zero switching frequency for a power switching transistor of the flyback conversion circuit in response to the bus voltage being greater than the third voltage and less than the first preset voltage and in response to the bus voltage increasing; and control the flyback conversion circuit to stop operating in response to the bus voltage being greater than the third voltage and less than the first preset voltage and in response to the bus voltage decreasing.

6. The motor controller according to claim 2, wherein the power supply control circuit is configured to, in response to the output voltage of the main power supply being greater than or equal to the second preset voltage:

control the flyback conversion circuit to have a non-zero switching frequency for a power switching transistor of the flyback conversion circuit in response to the bus voltage being greater than the second voltage, and control the flyback conversion circuit to stop operating after a preset time.

7. The motor controller according to claim 1, wherein the power supply control circuit is configured to, in response to the output voltage of the main power supply being greater than or equal to the second preset voltage:

control the flyback conversion circuit to stop operating.

8. The motor controller according to claim 1, wherein the power supply control circuit is configured to, in response to the output voltage of the main power supply not being greater than or equal to the second preset voltage, control the flyback conversion circuit to have a non-zero switching frequency for a power switching transistor of the flyback conversion circuit.

9. The motor controller of claim 1, wherein the power supply control circuit is configured to control the flyback conversion circuit to stop operating by causing a switching frequency of a power switching transistor of the flyback conversion circuit to be zero and causing the power switching transistor to be in an off state.

10. The motor controller according to claim 1, wherein:
the switching bridge arm comprises an upper bridge arm switching transistor and a lower bridge arm switching transistor;
the safety state control circuit is configured to output a safety state control signal to control a control apparatus; and
the motor controller further comprises the control apparatus configured to:
control, based on the safety state control signal, each upper bridge arm switching transistor and each lower bridge arm switching transistor of the switching bridge arm to be turned off, or
control, based on the safety state control signal, each upper bridge arm switching transistor of the switching bridge arm to be turned off and each lower bridge arm switching transistor to be turned on, or
control, based on the safety state control signal, each upper bridge arm switching transistor of the switching bridge arm to be turned on and each lower bridge arm switching transistor to be turned off.

11. A powertrain, comprising:
a motor; and
the motor controller according to claim 1, wherein the motor controller is configured to control running of the motor.

12. A method, comprising:
receiving, by a safety state control circuit, electric energy of a main power supply or a backup power supply;
controlling, by the safety state control circuit, a switching bridge arm;
controlling, by a power supply control circuit, the backup power supply to supply power to the safety state control circuit, wherein the backup power supply comprises a flyback conversion circuit;
receiving, by the flyback conversion circuit, a bus voltage across two ends of the switching bridge arm;
converting, by the flyback conversion circuit, the bus voltage;
supplying, by the flyback conversion circuit, power to the safety state control circuit; and
in response to an output voltage of the main power supply being greater than or equal to a second preset voltage and the bus voltage being greater than a first preset voltage, controlling, by the power supply control circuit, the flyback conversion circuit to stop operating.

13. The method according to claim 12, further comprising, in response to the output voltage of the main power supply being greater than or equal to the second preset voltage:
controlling, by the power supply control circuit, an operating status of the flyback conversion circuit in response to a result of comparing the bus voltage with at least one of a plurality of voltage thresholds, wherein the plurality of voltage thresholds comprise a first voltage, a second voltage, and a third voltage, the first voltage is less than or equal to the second voltage, the second voltage is less than or equal to the third voltage, and the third voltage is less than or equal to the first preset voltage.

14. The method according to claim 13, further comprising, in response to the output voltage of the main power supply being greater than or equal to the second preset voltage:
controlling, by the power supply control circuit, the flyback conversion circuit to stop operating in response to the bus voltage being less than or equal to the first voltage; and
controlling, by the power supply control circuit, the flyback conversion circuit to have a non-zero switching frequency for a power switching transistor of the flyback conversion circuit in response to the bus voltage being greater than or equal to the second voltage and less than or equal to the third voltage.

15. The method according to claim 13, further comprising, in response to the output voltage of the main power supply being greater than or equal to the second preset voltage:
controlling, by the power supply control circuit, the flyback conversion circuit to stop operating in response to the bus voltage being greater than the first voltage and less than the second voltage and in response to the bus voltage increasing; and
controlling, by the power supply control circuit, the flyback conversion circuit to have a non-zero switching frequency for a power switching transistor of the flyback conversion circuit in response to the bus voltage being greater than the first voltage and less than the second voltage and in response to the bus voltage decreasing.

16. The method according to claim 13, further comprising, in response to the output voltage of the main power supply being greater than or equal to the second preset voltage:
controlling, by the power supply control circuit, the flyback conversion circuit to have a non-zero switching frequency for a power switching transistor of the flyback conversion circuit in response to the bus voltage being greater than the third voltage and less than the first preset voltage and in response to the bus voltage increasing; and
controlling, by the power supply control circuit, the flyback conversion circuit to stop operating in response to the bus voltage being greater than the third voltage and less than the first preset voltage and in response to the bus voltage decreasing.

17. The method according to claim 13, further comprising, in response to the output voltage of the main power supply being greater than or equal to the second preset voltage:
controlling, by the power supply control circuit, the flyback conversion circuit to have a non-zero switching frequency for a power switching transistor of the flyback conversion circuit in response to the bus voltage being greater than the second voltage; and
controlling, by the power supply control circuit, the flyback conversion circuit to stop operating after a preset time.

18. The method according to claim 12, further comprising, in response to the output voltage of the main power supply being greater than or equal to the second preset voltage:
controlling, by the power supply control circuit, the flyback conversion circuit to stop operating.

19. The method according to claim 12, further comprising, in response to the output voltage of the main power supply not being greater than or equal to the second preset voltage:

controlling, by the power supply control circuit, the flyback conversion circuit to have a non-zero switching frequency for a power switching transistor of the flyback conversion circuit.

* * * * *